United States Patent [19]

Shiina

[11] Patent Number: 4,994,699
[45] Date of Patent: Feb. 19, 1991

[54] DRAIN COVER FOR YOKE OF DYNAMIC ELECTRIC MACHINE

[75] Inventor: Hiroyuki Shiina, Gunma, Japan
[73] Assignee: Mitsuba Electric Mfg. Co., Ltd., Gunma, Japan
[21] Appl. No.: 537,927
[22] Filed: Jun. 13, 1990
[30] Foreign Application Priority Data
  Sep. 30, 1988 [JP] Japan .................. 63-128614
[51] Int. Cl.$^5$ .............................. H02K 5/10
[52] U.S. Cl. ............................ 310/88; 310/89
[58] Field of Search .................. 310/88, 85, 89, 43, 310/42

[56] References Cited

U.S. PATENT DOCUMENTS

| | | | |
|---|---|---|---|
| 4,491,754 | 1/1985 | Gotoh | 310/43 |
| 4,808,871 | 2/1989 | Morishita | 310/89 |
| 4,945,270 | 7/1990 | Okamoto | 310/88 |

FOREIGN PATENT DOCUMENTS 0273339 11/1989 German Democratic Rep. ... 310/85

Primary Examiner—R. Skudy
Attorney, Agent, or Firm—Oliff & Berridge

[57] ABSTRACT

A drain cover for covering a pair of draining ports which are formed in the bottom of a cylindrical horizontal yoke of a dynamic electric machine at a distance from each other in the circumferential direction of the yoke. The drain cover has a box-like structure composed of a substantially rectangular bottom wall having an area large enough to cover a space under the draining ports, a pair of circumferentially extending side walls projecting upward from both axial end edges of the bottom wall into contact with the outer peripheral surface of the yoke, a pair of axially extending side walls projecting upward from both circumferential end edges of the bottom wall into contact with the outer peripheral surface of the yoke, discharge openings formed in the lower central portions of the circumferentially extending side walls, a pair of shield walls protruding upright from the bottom wall and opposing each other in the axial direction across the draining ports, and discharge openings formed in the lower central portions of the shield walls. The discharge openings in the circumferentially extending side walls and the discharge openings in the shield walls are sized such that each draining port, when viewed from the outside of the drain cover through a discharge opening in one of the circumferentially extending side walls, is hidden behind one of the shield walls which is adjacent to the one of the circumferentially extending side walls to prevent reverse flow of water into the machine.

11 Claims, 2 Drawing Sheets

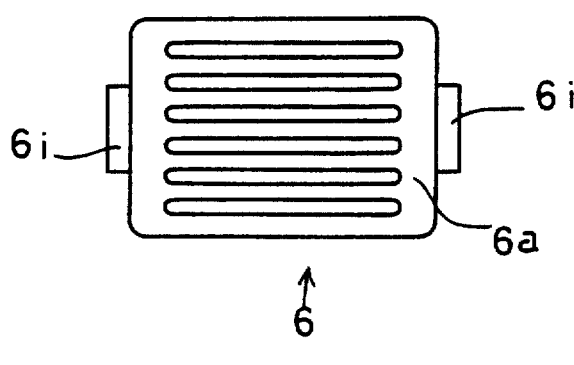
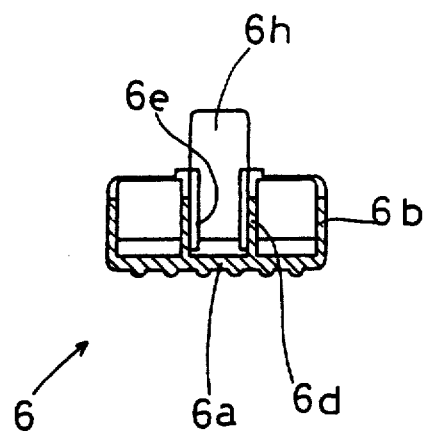
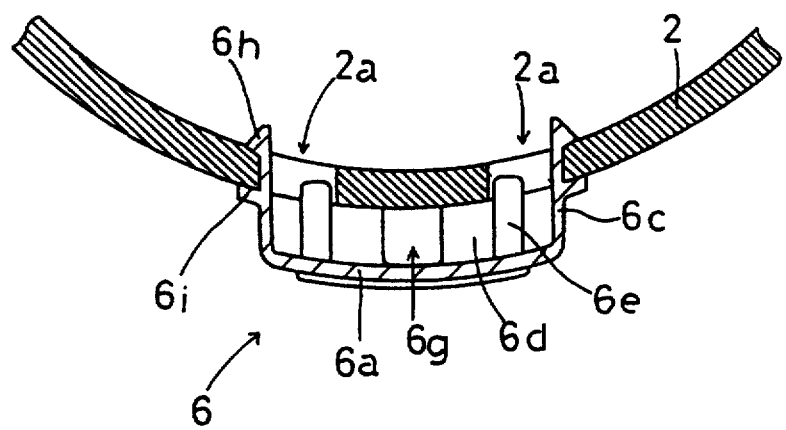
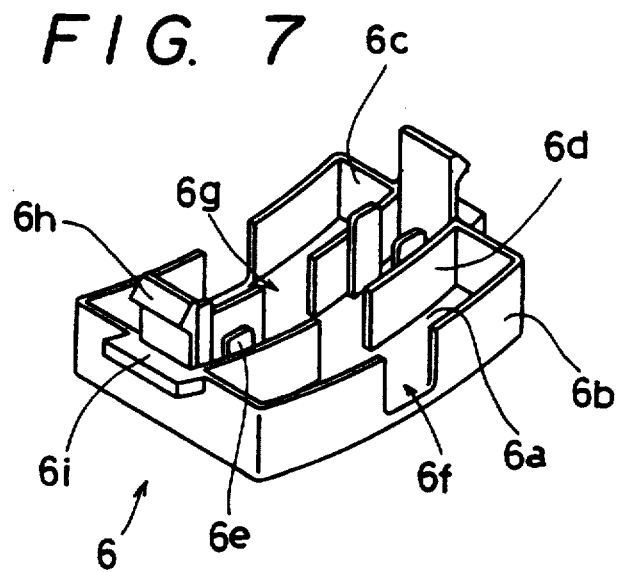

DRAIN COVER FOR YOKE OF DYNAMIC ELECTRIC MACHINE

BACKGROUND OF THE INVENTION

1. Field of the Invention

The present invention relates to a drain cover for a yoke which forms a casing of a dynamic electric machine such as an electric motor or a generator.

2. Description of the Related Art

In general, a yoke forming a casing of a dynamic electric machine has draining ports for discharging water which has entered the machine. The draining ports, however, often allow ambient water to come into the machine. To avoid such a problem, it is necessary to take a suitable measure such as provision of a drain cover. Conventionally, the drain cover is formed from an elongated tube-type member connected to the draining port. This type of drain cover, however, tends to impede drainage because the water which is being discharged tends to stop flowing at an intermediate portion of the draining passage in the drain cover due to surface tension. In addition, the drain cover which is elongated to project from the yoke is liable to interfere with other members.

SUMMARY OF THE INVENTION

Accordingly, an object of the present invention is to provide a drain cover for a yoke of a dynamic electric machine which is capable of overcoming the above-described problems.

To this end, according to the present invention, there is provided a drain cover for covering a pair of draining ports formed in the bottom of a cylindrical horizontal yoke of a dynamic electric machine, the draining ports being located on both sides of the lowermost portion of the yoke and spaced from each other in the circumferential direction of the yoke, the drain cover comprising: a substantially rectangular bottom wall having an area large enough to cover a space under the draining ports; a pair of circumferentially extending side walls projecting upward from both axial end edges of the bottom wall into contact with the outer peripheral surface of the yoke; a pair of axially extending side walls projecting upward from both circumferential end edges of the bottom wall into contact with the outer peripheral surface of the yoke; retaining claws projecting from the upper ends of the axially extending side walls for engagement with the circumferentially outer edges of the draining ports; discharge openings formed in the lower central portions of the circumferentially extending side walls; a pair of shield walls protruding upright from the bottom wall and opposing each other in the axial direction across the draining ports; and discharge openings formed in the lower central portions of the shield walls and allowing water flowing from the draining ports into the space between the shield walls to flow towards the discharge openings in the circumferentially extending side walls; wherein the discharge openings in the circumferentially extending side walls and the discharge openings in the shield walls are sized such that each draining port, when viewed from the outside of the drain cover through the discharge opening in one of the circumferentially extending side walls, is hidden behind one of the shield walls which is adjacent to the one of the circumferentially extending side walls.

The drain cover having the described construction is superior both in draining performance and reverse-flow prevention performance, and can minimize the risk of interference with other members.

The above and other objects, features and advantages of the present invention will become clear from the following description of the preferred embodiment when the same is read in conjunction with the accompanying drawings.

BRIEF DESCRIPTION OF THE DRAWINGS

FIG. 4 is a bottom plan view of the drain cover;

FIG. 5 is a sectional front elevational view of the yoke with the drain cover attached thereto;

FIG. 6 is a sectional side elevational view of the drain cover; and

FIG. 7 is a perspective view of the drain cover.

DESCRIPTION OF THE PREFERRED EMBODIMENT

Figure 1:
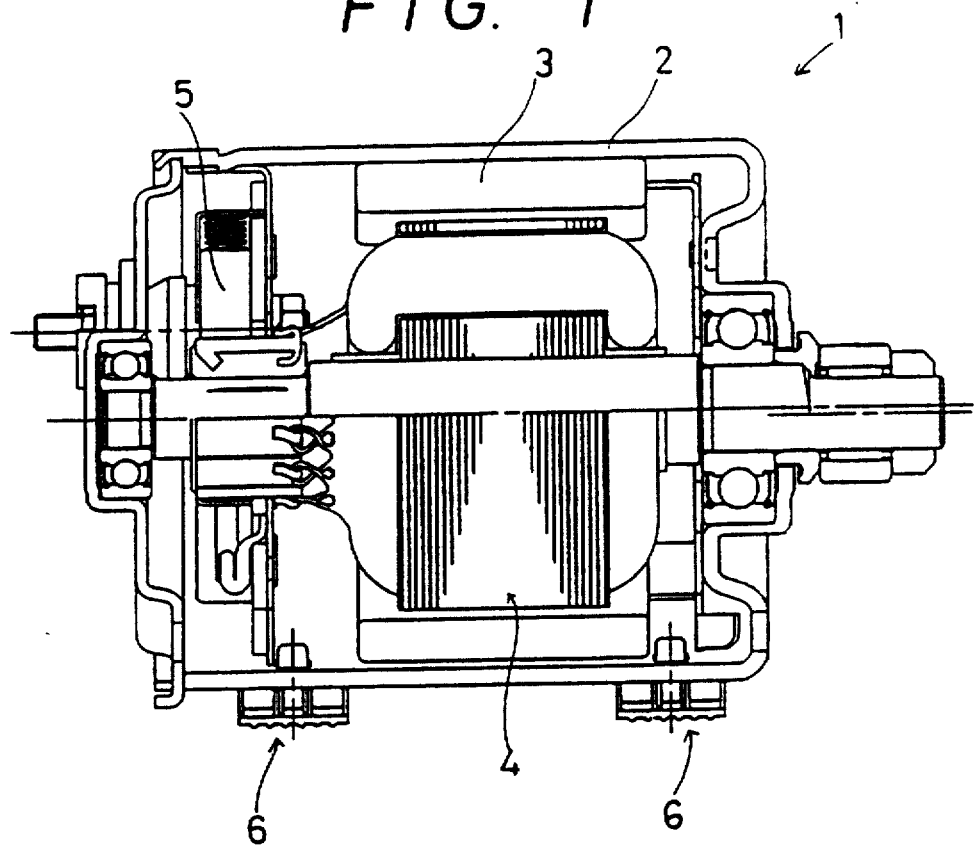
FIG. 1 is a sectional view of an electric motor having a yoke provided with a drain cover embodying the present invention.
Figure 2:
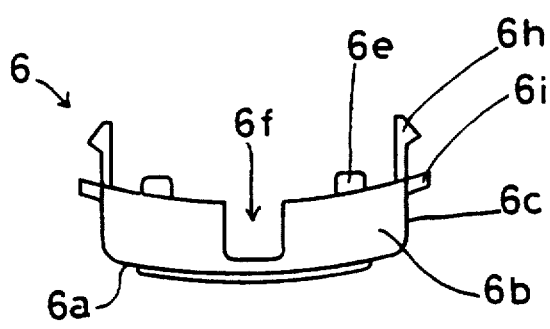
FIG. 2 is a front elevational view of the drain cover.
Figure 3:
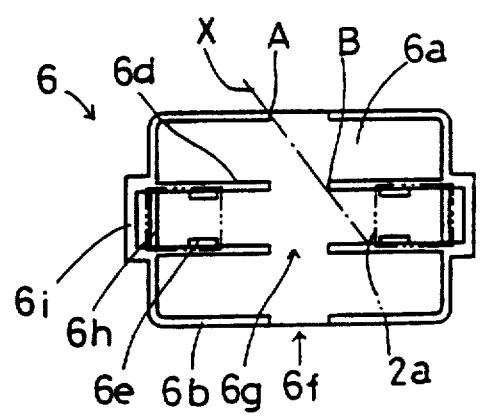
FIG. 3 is a top plan view of the drain cover.

An embodiment of the present invention will be described with reference to the accompanying drawings.

Referring to the drawings, an electric motor 1 has a yoke 2, permanent magnets 3 fixed to the inner peripheral surface of the yoke 2, a rotor core 4 rotatably mounted in the yoke 2, brushes 5 and other members as well known to those skilled in the art.

A pair of draining ports 2a, 2a are formed in the wall of the yoke 2 at both sides of the lowermost portion of the yoke so as to be spaced circumferentially from each other. In the illustrated embodiment, there are two pairs of such drain ports 2a, 2a, one near one axial end of the yoke and the other near the other axial end of the yoke. A drain cover 6 of the present invention is associated with each pair of the drain ports 2a, 2a. Namely, the drain cover 6 is made of a resilient resin material, and has a generally box-like construction composed of a rectangular bottom wall 6a shaped and sized so as to cover the lower side of the region where the drain ports 2a, 2a are formed, and side walls 6b, 6c protruding upward from the side ends of the bottom wall 6a so as to contact the outer peripheral surface of the yoke 2. Retaining claws 6h projected from the side walls 6c, 6c opposed in the circumferential direction of the yoke are adapted to engage with circumferentially outer edges of the draining ports 2a, 2a so that the drain cover 6 is secured to the yoke 2. A pair of shield walls 6d, 6d are formed on the bottom wall 6a so as to protrude therefrom and to oppose each other in the axial direction of the yoke 2 across the draining ports 2a, 2a. Each shield wall 6d is provided with two guide plates 6e, the four guide plates 6e projecting into the draining ports 2a, 2a so as to substantially contact the axially inner edges and circumferentially inner edges of these ports, thereby correctly locating the drain cover 6 both in the circumferential and axial directions of the yoke, while unburdening the retaining claws 6h, 6h.

Discharge openings 6f, 6f are formed in the axially opposing side walls 6b, 6b of the drain cover 6 substantially at circumferentially mid portions near the lower ends of these side walls 6b, 6b. Similarly, discharge openings 6g, 6g are formed in the shield walls 6d, 6d substantially at circumferentially mid portions near the lower ends of these shield walls 6d, 6d. Thus, water discharged through the draining ports 2a, 2a into the space between the shield walls 6d, 6d is allowed to flow towards the discharge openings 6f, 6f via the discharge openings 6g, 6g. The discharge openings 6f, 6f and 6g, 6g are so sized that each draining port 2a is located on the circumferentially outer side of an imaginary line X which interconnects the edge A of the discharge opening 6f more remote from the discharge port 2a and the edge B of the adjacent discharge opening 6g closer to this draining port 2a, so that this draining port 2a is hidden behind the shield wall 6d when viewed through the discharge opening 6f from the exterior of the drain cover 6. This positional relationship also exists with respect to the other draining port 2a. Namely, when viewed through the discharge opening 6f in the other side wall 6b, the other draining port 2a is hidden behind the shield wall 6d adjacent this side wall 6b. Numeral 6i denotes retaining tabs projected for cooperation with the retaining claws 6h.

The operation of the embodiment having the described construction is as follows. Water which has entered the motor 1 is collected on the bottom of the yoke 2 and is allowed to flow outside the yoke through the draining ports 2a, 2a into the drain cover 6 and is then discharged to the outside through the discharge openings 6f. Namely, the water from the draining ports is collected in the space between the shield walls 6d, 6d and flows through the discharge openings 6g, 6g to reach the discharge openings 6f, 6f so as to be discharged therefrom.

It is thus possible to discharge the water through the draining ports 2a, 2a and then through the drain cover 6. According to the invention, the drain cover 6 effectively prevents reverse flow of the water through the draining ports 2a, 2a, as will be understood from the following description.

The space under the draining ports 2a, 2a is covered by the bottom wall 6a and the pairs of side walls 6b, 6c, so that external water can reach inside the cover 6 only through the discharge openings 6f, 6f formed in the side walls 6b, 6b. Part of any water which has entered the space inside the drain cover 6 through the discharge openings 6f, 6f may reach the adjacent shield walls 6d, 6d. As stated before, however, the discharge openings 6f, 6f in the side walls 6b, 6b and the discharge openings 6g, 6g in the shield walls 6d, 6d are so positioned and sized that each draining port 2a is hidden behind a shield wall 6d when viewed through a discharge opening 6f from the exterior of the drain cover 6. Namely, each draining port 2a is located on the circumferentially outer side of an imaginary line X which interconnects the edge A of the discharge opening 6f more remote from the draining port 2a and the edge B of the adjacent discharge opening 6g closer to this draining port 2a. Therefore, the water coming into the drain cover 6 through each discharge opening 6f impinges upon the adjacent shield wall 6d and, therefore, cannot reach the adjacent draining port 2a, whereby any reverse flow of water into the yoke 2 through the draining ports 2a, 2a is prevented. The guide plates 6e and the retaining tabs 6i also contribute to prevention of the reverse flow of water, thus enhancing the reverse-flow prevention effect. The drain cover 6 projects radially outward from the yoke 2 but the amount of projection is very small by virtue of the use of the bottom wall 6a, as compared with known drain covers which employ elongated tube-type members. Consequently, the risk of the drain cover interfering with other members during, for example, installation of the motor can be minimized.

In the illustrated embodiment, there are two pairs of draining ports 2a, 2a, the ports of each pair being spaced from each other in the circumferential direction of the yoke, so that the draining effect is never impaired by any slight rotational deviation of the yoke during installation of the motor. Consequently, the motor can be installed with a greater degree of freedom of position in the circumferential direction.

Although the invention has been described in its preferred form, it is to be noted that the described embodiment is only illustrative and various changes and modifications may be imparted thereto without departing from the scope of the invention which is limited solely by the appended claims.

What is claimed is:

1. A drain cover for covering at least one draining port formed in a yoke of a dynamic electric machine, said drain cover comprising;
    a substantially rectangular bottom wall having an area large enough to cover a space under said draining port;
    a pair of circumferentially extending side walls projecting upward from both axial end edges of said bottom wall into contact with the outer peripheral surface of said yoke;
    a pair of axially extending side walls projecting upward from both circumferential end edges of said bottom wall into contact with the outer peripheral surface of said yoke;
    a discharge opening formed in at least one of said circumferentially extending side walls; and
    means for preventing reverse flow of water through said discharge opening and said draining port into said machine.

2. The drain cover of claim 1, wherein said preventing means comprises:
    at least one shield wall protruding upright from said bottom wall; and
    a discharge opening formed in said shield wall and allowing water flowing from said draining port to flow towards said discharge opening in said one of said circumferentially extending side walls;
    wherein said discharge opening in said one of said circumferentially extending side walls and said discharge opening in said shield wall are positioned and sized such that said draining port, when viewed from the outside of said drain cover through said discharge opening in said one of said circumferentially extending side walls, is hidden behind said shield wall, to thereby prevent reverse flow of water into said machine.

3. The drain cover of claim 2, further comprising retaining claws projecting from upper ends of said axially extending side walls for engagement with circumferentially outer edges of said draining port.

4. The drain cover of claim 3, further comprising retaining tabs cooperating with said retaining claws to assist in retaining said drain cover on said yoke and to further prevent reverse flow of water into said machine.

5. The drain cover of claim 2, wherein said discharge openings in said one of said circumferentially extending side walls and said shield wall are formed in lower central portions of said one of said circumferentially extending side walls and said shield wall.

6. The drain cover of claim 2, further comprising at least one guide plate projecting into said draining port to thereby correctly locate said drain cover on said yoke.

7. A drain cover for covering a pair of draining ports formed in the bottom of a cylindrical horizontal yoke of a dynamic electric machine, said draining ports being located on both sides of the lowermost portion of said yoke and spaced from each other in the circumferential direction of said yoke, said drain cover comprising:
- a substantially rectangular bottom wall having an area large enough to cover a space under said draining ports;
- a pair of circumferentially extending side walls projecting upward from both axial end edges of said bottom wall into contact with the outer peripheral surface of said yoke;
- a pair of axially extending side walls projecting upward from both circumferential end edges of said bottom wall into contact with the outer peripheral surface of said yoke;
- discharge openings formed in the lower central portions of said circumferentially extending side walls;
- a pair of shield walls protruding upright from said bottom wall and opposing each other in the axial direction across said draining ports; and
- discharge openings formed in the lower central portions of said shield walls and allowing water flowing from said draining ports into the space between said shield walls to flow towards said discharge openings in said circumferentially extending side walls;
- wherein said discharge openings in said circumferentially extending side walls and said discharge openings in said shield walls are sized such that each draining port, when viewed from the outside of said drain cover through one of said discharge openings in one of the circumferentially extending side walls, is hidden behind on of said shield walls which is adjacent to said one of said circumferentially extending side walls, to thereby prevent reverse flow of water into said machine.

8. The drain cover of claim 7, further comprising retaining claws projecting from upper ends of said axially extending side walls for engagement with circumferentially outer edges of said draining ports.

9. The drain cover of claim 8, further comprising retaining tabs cooperating with said retaining claws to assist in retaining said drain cover on said yoke and to further prevent reverse flow of water into said machine.

10. The drain cover of claim 8, further comprising two guide plates projecting into each of said draining ports so as to substantially contact axially and circumferentially inner edges of said draining ports to thereby correctly locate said drain cover in the circumferential and axial directions of said yoke.

11. A drain cover for covering a pair of draining ports formed in the bottom of a cylindrical horizontal yoke of a dynamic electric machine, said draining ports being located on both sides of the lowermost portion of said yoke and spaced from each other in the circumferential direction of said yoke, said drain cover comprising:
- a substantially rectangular bottom wall having an area large enough to cover a space under said draining ports;
- a pair of circumferentially extending side walls projecting upward from both axial end edges of said bottom wall into contact with the outer peripheral surface of said yoke;
- a pair of axially extending side walls projecting upward from both circumferential end edges of said bottom wall into contact with the outer peripheral surface of said yoke;
- retaining claws projecting from upper ends of said axially extending side walls for engagement with circumferentially outer edges of said draining ports;
- retaining tabs cooperating with said retaining claws to assist in retaining said drain cover on said yoke and to help prevent reverse flow of water into said machine;
- two guide plates projecting into each of said draining ports so as to substantially contact axially and circumferentially inner edges of said draining ports to thereby correctly locate said drain cover in the circumferential and axial directions of said yoke;
- discharge openings formed in the lower central portions of said circumferentially extending side walls;
- a pair of shield walls protruding upright from said bottom wall and opposing each other in the axial direction across said draining ports; and
- discharge openings formed in the lower central portions of said shield walls and allowing water flowing from said draining ports into the space between said shield walls to flow towards said discharge openings in said circumferentially extending side walls;
- wherein said discharge openings in said circumferentially extending side walls and said discharge openings in said shield walls are sized such that each draining port, when viewed from the outside of said drain cover through one of said discharge openings in one of the circumferentially extending sidewalls, is hidden behind one of said shield walls which is adjacent to said one of said circumferentially extending sidewalls.

* * * * *